US 11,593,310 B2

United States Patent
Cseri et al.

(10) Patent No.: US 11,593,310 B2
(45) Date of Patent: Feb. 28, 2023

(54) PROVIDING WRITABLE STREAMS FOR EXTERNAL DATA SOURCES

(71) Applicant: Snowflake Inc., Bozeman, MT (US)

(72) Inventors: Istvan Cseri, Seattle, WA (US); Tyler Jones, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/821,985

(22) Filed: Aug. 24, 2022

(65) Prior Publication Data
US 2022/0405249 A1     Dec. 22, 2022

Related U.S. Application Data

(63) Continuation of application No. 17/517,398, filed on Nov. 2, 2021, now Pat. No. 11,461,274, which is a continuation of application No. 16/813,048, filed on Mar. 9, 2020, now Pat. No. 11,188,502.

(51) Int. Cl.
| | |
|---|---|
| *G06F 16/17* | (2019.01) |
| *G06F 16/182* | (2019.01) |
| *G06F 16/18* | (2019.01) |
| *G06F 11/14* | (2006.01) |
| *G06F 16/14* | (2019.01) |

(52) U.S. Cl.
CPC ...... *G06F 16/1734* (2019.01); *G06F 11/1471* (2013.01); *G06F 16/144* (2019.01); *G06F 16/1824* (2019.01); *G06F 16/1858* (2019.01); *G06F 2201/80* (2013.01)

(58) Field of Classification Search
None
See application file for complete search history.

(56) References Cited

U.S. PATENT DOCUMENTS

| | | | |
|---|---|---|---|
| 11,188,502 B2 | 11/2021 | Cseri et al. | |
| 11,461,274 B2 | 10/2022 | Cseri et al. | |
| 2006/0075277 A1 | 4/2006 | Johnson et al. | |
| 2008/0117907 A1 | 5/2008 | Hein | |
| 2017/0344481 A1 | 11/2017 | Pack, III | |
| 2018/0089276 A1 | 3/2018 | Victor et al. | |

(Continued)

OTHER PUBLICATIONS

"U.S. Appl. No. 16/813,048, Final Office Action dated Jul. 2, 2021", 17 pgs.

(Continued)

*Primary Examiner* — Kris E Mackes
*Assistant Examiner* — Soheila (Gina) Davanlou
(74) *Attorney, Agent, or Firm* — Schwegman Lundberg & Woessner, P.A.

(57) ABSTRACT

The subject technology determines, using a connection to an external data source, a set of shards stored in an external data source, the connection to the external data source being established using an external integration, the external integration including security and configuration information. The subject technology determines a set of offsets of each shard of the set of shards. The subject technology generates a query plan indicating a degree of parallelism based at least in part on a size of the set of offsets. The subject technology, based on the set of shards and the set of offsets, performs an operation on the external data source by performing, using the connection to the external data source, a write operation from a query statement on the external data source, the external data source being different than a storage platform associated with the system.

30 Claims, 8 Drawing Sheets

(56) References Cited

U.S. PATENT DOCUMENTS

| 2018/0198837 A1 | 7/2018 | Kurian et al. |
| 2019/0141006 A1 | 5/2019 | Schnitt |
| 2020/0125572 A1 | 4/2020 | Hanckel et al. |
| 2021/0279209 A1 | 9/2021 | Cseri et al. |
| 2022/0058160 A1 | 2/2022 | Cseri et al. |

OTHER PUBLICATIONS

"U.S. Appl. No. 16/813,048, Final Office Action dated Dec. 14, 2020", 16 pgs.
"U.S. Appl. No. 16/813,048, Non-Final Office Action dated Mar. 8, 2021", 17 pgs.
"U.S. Appl. No. 16/813,048, Non-Final Office Action dated May 15, 2020", 15 pgs.
"U.S. Appl. No. 16/813,048, Notice of Allowance dated Oct. 20, 2021", 8 pgs.
"U.S. Appl. No. 16/813,048, Response filed Feb. 16, 2021 to Final Office Action dated Dec. 14, 2020", 14 pgs.
"U.S. Appl. No. 16/813,048, Response filed Jun. 8, 2021 to Non-Final Office Action dated Mar. 8, 2021", 15 pgs.
"U.S. Appl. No. 16/813,048, Response filed Aug. 13, 2020 to Non-Final Office Action dated May 15, 2020", 12 pgs.
"U.S. Appl. No. 16/813,048, Response filed Sep. 30, 2021 to Final Office Action dated Jul. 2, 2021", 12 pgs.
"U.S. Appl. No. 17/517,398, Notice of Allowance dated Jun. 9, 2022", 8 pgs.

600

RECEIVE AN OPERATION FOR READING DATA ON AN EXTERNAL DATA STREAM PLATFORM
602

DETERMINE A CURRENT SET OF SHARDS AND OFFSETS
604

BASED ON THE CURRENT SET OF SHARDS AND OFFSETS, PERFORM THE OPERATION ON THE EXTERNAL DATA STREAM PLATFORM
606

RECEIVE DATA FROM THE EXTERNAL DATA STREAM PLATFORM
608

INDICATE OPERATION IS COMPLETE
610

PROVIDING WRITABLE STREAMS FOR EXTERNAL DATA SOURCES

CROSS-REFERENCE TO RELATED APPLICATIONS

This application is a continuation of U.S. patent application Ser. No. 17/517,398, entitled "PROCESSING STREAMS ON EXTERNAL DATA SOURCES," filed on Nov. 2, 2021, which is a continuation of U.S. patent application Ser. No. 16/813,048 titled "READABLE AND WRITABLE STREAMS ON EXTERNAL DATA SOURCES", filed Mar. 9, 2020 and now issued as U.S. Pat. No. 11,188,502, the contents of each are incorporated herein by reference in their entireties.

TECHNICAL FIELD

Embodiments of the disclosure relate generally to databases and, more specifically, to utilizing data stream platforms in order to access data for storage in the databases.

BACKGROUND

Databases are widely used for data storage and access in computing applications. A goal of database storage is to provide enormous sums of information in an organized manner so that it can be accessed, managed, and updated. In a database, data may be organized into rows, columns, and tables. Databases are used by various entities and companies for storing information that may need to be accessed or analyzed.

A cloud data warehouse (also referred to as a "network-based data warehouse" or simply as a "data warehouse") is one type of network-based data system used for data analysis and reporting that comprises a central repository of integrated data from one or more disparate sources. A cloud data warehouse is commonly an online analytical processing (OLAP) database that can store current and historical data that can be used for creating analytical reports for an enterprise, based on data stored within databases of the enterprise. To this end, data warehouses typically provide business intelligence tools, tools to extract, transform, and load data into the repository, and tools to manage and retrieve metadata. There are other types of network-based data systems, such as online transaction processing (OLTP) databases, as well as data systems that operate with characteristics of multiple types of traditional database systems.

When certain information is to be extracted from a database, a query statement may be executed against the database data. A cloud data warehouse system (or "database system") processes the query and returns certain data according to one or more query predicates that indicate what information should be returned by the query. The data warehouse system extracts specific data from the database and formats that data into a readable form. However, it can be challenging to execute queries on a very large table at least because a significant amount of time and computing resources are required to scan an entire table to identify data that satisfies the query.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
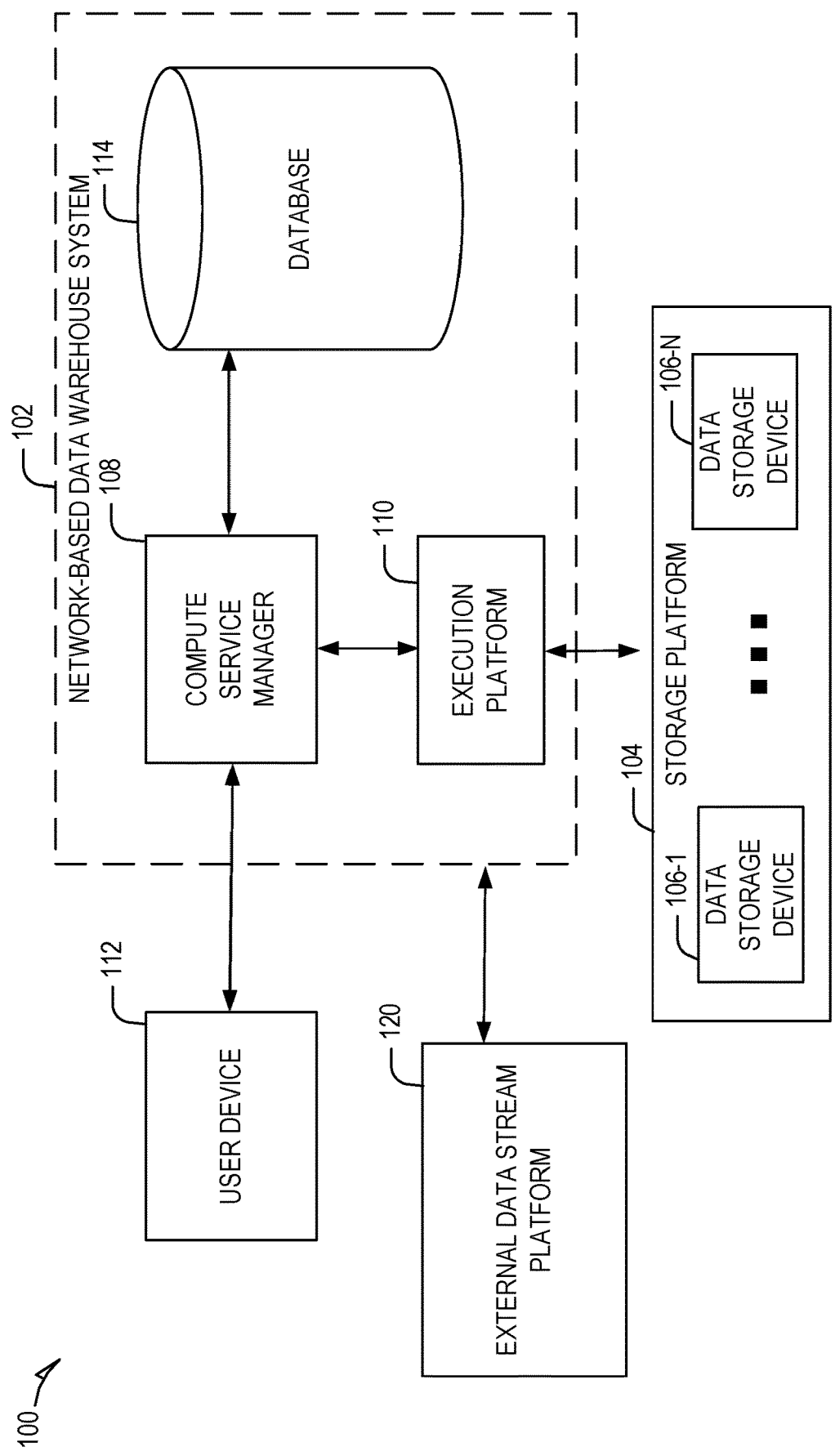
FIG. 1 illustrates an example computing environment that includes a network-based data warehouse system in communication with a storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, processing queries directed to very large tables is challenging because a significant amount of time and computing resources are required to scan an entire table to identify data that satisfies the query. Therefore, executing a query without scanning the entire table can result in performance improvements to a data warehouse system (or "database system") and improve latency for returning a result of the query. In some existing data warehouse systems, one approach is to provide support for table streams, which in an example can be implemented as objects that expose Change Data Capture (CDC) information from tables, views, and materialized views, and the like. Such CDC information represents salient changes to data including inserts, updates, and deletes, as well as metadata about each change. In particular, an individual table stream tracks the changes made to rows in a source table. A table stream (referred to herein as a "stream") generates a "change table" with information indicating changes, at the row level, between two transactional points of time in a table. When executing a query corresponding to a current transaction, the data warehouse system can utilize the stream to determine changes since a prior transaction (e.g., prior query). In this manner, the stream enables querying and consuming a sequence of change records in a transactional fashion, which provide a convenient way to continuously process new or changed data.

In today's expanding cloud computing environment, however, many users may process queries in different data sources (e.g., for extracting, transforming, and loading data into a new host source to perform data analytics on the data), sometimes across various storage platforms, which may be hosted by third parties. In some existing data warehouse systems, although streams for data may be provided, access to external data sources via streams is not supported. Aspects of the present disclosure address the above and other challenges in processing queries, in external data sources, by advantageously enabling the subject system to leverage streams of data provided in external data stream platforms. More specifically, as described in embodiments herein, an external stream, using a stream object, is implemented that facilitates performing an operation (e.g., read or write), in response to a query, on an external data stream platform in a transactional manner and to track the delta of changes in the external data source.

Existing solutions expose a system that may not be interacted via directly and do not easily allow for transformations to incoming data and interval scheduling, or require third party software systems to manage data ingestion and data export on behalf of the user, typically in a non-streaming manner. The subject technology advantageously provides technical improvements to a computing system directed to a practical application of enabling ingesting data from streaming sources into a data warehouse natively as well as enabling users to stream data from the data warehouse into external/third party sources via the subject system that is controlled by the user.

FIG. 1 illustrates an example computing environment 100 that includes a network-based data warehouse system 102 in communication with a storage platform 104, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In some embodiments, example computing environment 100 will comprise a network-based database system other than a data warehouse system.

As shown, the computing environment 100 comprises the network-based data warehouse system 102 and a storage platform 104 (e.g., AWS®, Microsoft Azure Blob Storage®, or Google Cloud Storage®). The network-based data warehouse system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the network-based data warehouse system 102.

The network-based data warehouse system 102 comprises a compute service manager 108, an execution platform 110, and a database 114. The network-based data warehouse system 102 hosts and provides services to multiple client accounts. Administrative users can create and manage identities (e.g., users, roles, and groups) and use permissions to allow or deny access to the identities to resources and services.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager is also in communication with a user device 112. The user device 112 corresponds to a user of one of the multiple client accounts supported by the network-based data warehouse system 102. In some embodiments, the compute service manager 108 does not receive any direct communications from the user device 112 and only receives communications concerning jobs from a queue within the network-based data warehouse system 102.

The compute service manager 108 is also coupled to database 114, which is associated with the data stored the computing environment 100. The database 114 stores data pertaining to various functions and aspects associated with the network-based data warehouse system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

For example, the database 114 can include information corresponding to a set of micro-partitions. As discussed herein, a "micro-partition" is a batch unit and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

In some embodiments, the compute service manager 108 may determine that a job should be performed based on data from the database 114. In such embodiments, the compute service manager 108 may scan the data and determine that a job should be performed to improve data organization or database performance. For example, the compute service manager 108 may determine that a new version of a source table has been generated and the pruning index has not been refreshed to reflect the new version of the source table. The database 114 may include a transactional change tracking stream indicating when the new version of the source table was generated and when the pruning index was last refreshed. Based on that transaction stream, the compute service manager 108 may determine that a job should be performed. In some embodiments, the compute service manager 108 determines that a job should be performed based on a trigger event and stores the job in a queue until the compute service manager 108 is ready to schedule and manage the execution of the job. In an embodiment of the disclosure, the compute service manager 108 determines whether a table or pruning index needs to be reclustered based on one or more DML commands being performed, wherein one or more of DML commands constitute the trigger event.

The compute service manager 108 is further coupled to the execution platform 110, which provides multiple computing resources that execute various data storage and data retrieval tasks. The execution platform 110 is coupled to storage platform 104 of the storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the network-based data warehouse system 102 based on the changing data storage/retrieval needs as well as the changing needs of the users and systems. The support of dynamic changes allows the network-based data warehouse system 102 to scale quickly in response to changing demands on the systems and components within the network-based data warehouse system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

As further illustrated, the network-based data warehouse system 102 is enabled to communicate with an external data stream platform 120. In this example, the external data stream platform may be provided by a third party and accessible by one or more components of the network-based data warehouse system 102 (e.g., the compute service manager 108 and/or the execution platform 110). Some examples of such a data stream platform include Apache Kafka®, Amazon Kinesis® and the like. Such external data stream platforms provide external data sources which are then accessible by the components of the network-based data warehouse system 102.

As mentioned herein, a stream object tracks data manipulation language (DML) changes made to tables, including inserts, updates, and deletes, as well as metadata about each change, so that actions can be taken using the changed data. This process is referred to as change data capture (CDC). An individual table stream tracks the changes made to rows in a source table. As mentioned before, a stream provides a "change table" indicating such changes, at the row level, between two transactional points of time in a table, thereby enabling querying and consuming a sequence of change records in a transactional manner.

In an embodiment, a stream maintains a point of time into the transactional versioned timeline of the source table, called an offset, which starts at the transactional point when the stream contents were last consumed using a DML statement. The stream can provide the set of changes from the current offset to the current transactional time of the source table (e.g., the current version of the table). In an example, the stream maintains the delta of the changes; if multiple DML, statements change a row, the stream contains only the latest action taken on that row. In an embodiment, the offset is advanced (e.g., updated) when utilized in a transaction.

Figure 2:
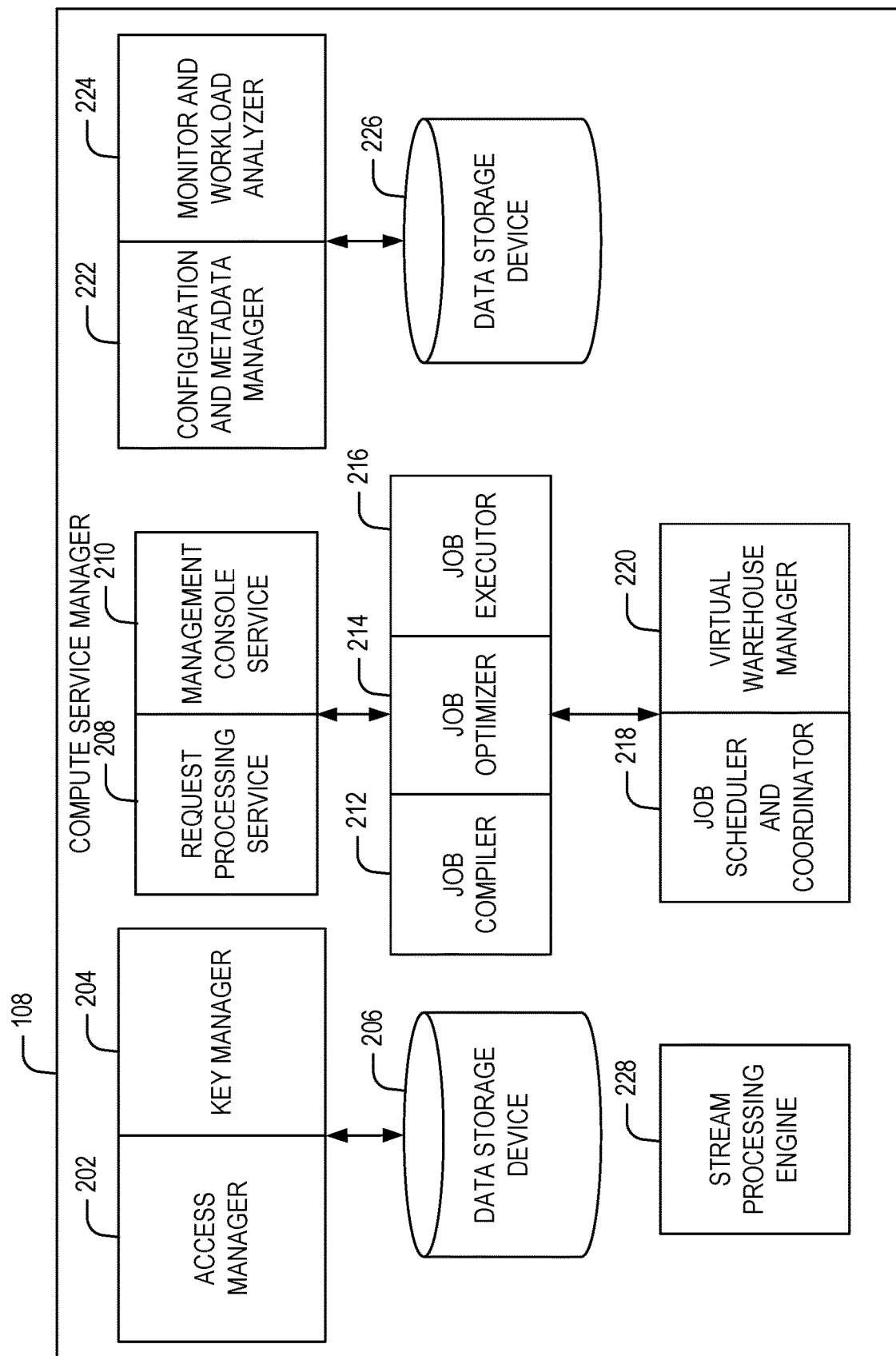
FIG. 2 is a block diagram illustrating components of a compute service manager, in accordance with some example embodiments.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices." Additionally, the access manager 202 handles authorization and authentication tasks for stream objects as discussed further herein.

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistribute tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represent any data storage device within the network-based data warehouse system 102. For example, data storage device 226 may represent caches in execution platform 110, storage devices in storage platform 104, or any other storage device.

As shown, the compute service manager 108 further includes a stream processing engine 228. In an embodiment, the stream processing engine 228 is responsible for generating and managing streams, which are implemented as objects that, in an example, expose change data capture (CDC) information from tables, views, materialized views (e.g., database objects that contain results of respective queries), and/or external tables. Further, the stream processing engine 228 is configured to support streams on external sources, such as the external data stream platform 120. Further details regarding the processing of streams with an external source are discussed further below.

Figure 3:
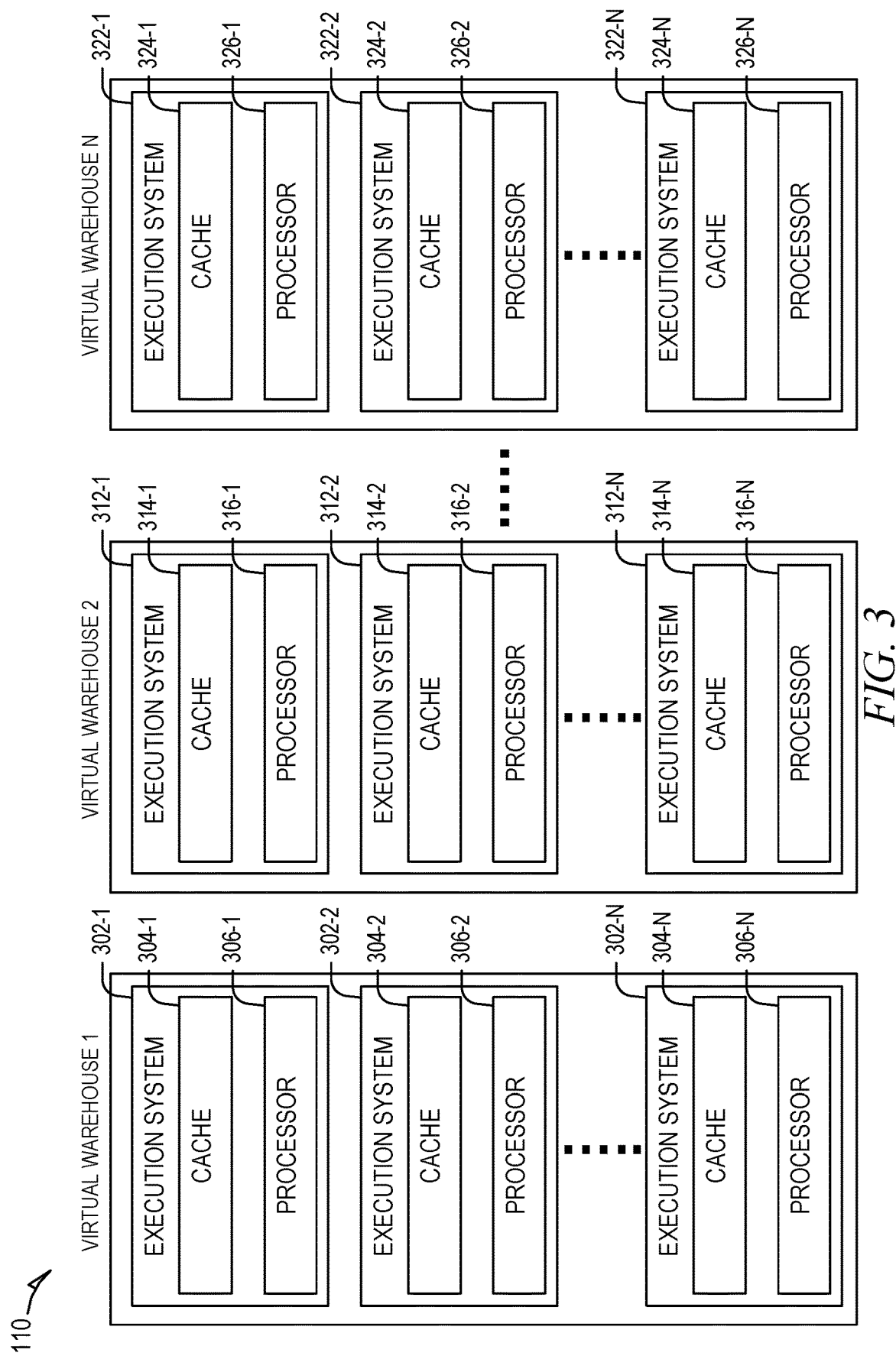
FIG. 3 is a block diagram illustrating components of an execution platform, in accordance with some example embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

The following discussion relates to generating an external stream, in accordance with some embodiments. To provide interoperability with external sources, such as the external data stream platform 120, the stream processing engine 228 is configured to generate an external stream, which is utilized for responding to a query on the external data stream platform 120 as discussed further below. As discussed further below, a stream object may be utilized to represent to external stream and provides functions and/or methods for performing operations on an external data source, such as the external data stream platform 120.

In an embodiment, the following example syntax (e.g., pseudocode statements) enables the stream processing engine 228 to generate an external stream and perform an additional operation(s) using the external stream:

CREATE [OR REPLACE] EXTERNAL STREAM STREAM_NAME
　TYPE={SUPPORTED_EXTERNAL_SOURCE}
　　USING EXTERNAL INTEGRATION
　　MY_EXTERNAL_INTEGRATION
　　SELECT * FROM STREAM_NAME;
　　INSERT INTO STREAM_NAME AS SELECT * FROM MY_TABLE;

In the above syntax, TYPE is the type of an external source, which corresponds to an external data stream platform (e.g., the external data stream platform 120) supported by the network-based data warehouse system 102. In an embodiment, example types of supported external sources include Apache Kafka® and Amazon Kinesis®. Further, the syntax USING EXTERNAL INTEGRATION specifies an external integration that can be utilized for initializing a connection to the external source. In an example, the external integration includes security and configuration information. Example configuration information include a Kafka® topic name, a Kinesis® shard number, a retry timeout, maximum number of Kafka® offsets to process, request timeout, and the like.

Additionally, in the above syntax, the SELECT query statement corresponds to an example statement of reading from the external stream, and the INSERT query statement corresponds to an example statement of writing to the external stream.

As used herein, the term "shard" refers to a partition of data in a database. For example, in an implementation, a shard can correspond to a horizontal partition of data stored in a given database system. In some database systems, such shards can be referred to as partitions depending on the particular database system implementation (e.g., Kafka®). Further, a given shard can include a sequence of data records.

The following is example pseudocode for executing a read operation on a stream:

SELECT . . .
FROM STREAM_NAME . . .
{
　AT({OFFSET=><time_difference>})>
　<USING EXTERNAL INTEGRATION INTEGRATION_NAME>
}

In the above example syntax, the "AT" clause is optional since the stream uses the last offset that was advanced to when the stream was consumed (e.g., previously). The "USING" integration clause is also optional since the integration can be associated with the stream at a time when the stream is created.

In the above example syntax, the "AT" syntax accepts a shard/offset pair in a format as supported by the type of external source (e.g., the external data stream platform 120). For instance, a shard/offset pair could be a partition/offset pair for Kafka®, or a shard/sequence number pair for Kinesis®. In the above, the "CHANGES" syntax accepts "ALL" for information.

In the above, "USING EXTERNAL INTEGRATION" represents an optional, external integration that can be utilized with initializing a connection to the external data stream platform 120, which may include security and configuration information that is different from offset information. Example configuration information may include a retry timeout, maximum number of offsets to process, request timeout, and the like.

In an embodiment, to enable reading from a given external stream provided by an external source (e.g., the external data stream platform 120), the network-based data warehouse system 102 communicates with the external source to determine (e.g., discover) a number of divisible units of data (e.g., shards). Based on the number of divisible units of data (e.g., shards), the network-based data warehouse system 102 loads data in parallel using available resources (e.g., respective execution nodes) of the execution platform 110, and stores an indication corresponding to the data that was last read (e.g., a position or offset within a particular shard) from the external source when committing a transaction. To facilitate this, the network-based data warehouse system 102 maintains a stream state, which contains metadata relating to the data that was read from the external source (e.g., a start offset and an end offset). In an example, such metadata includes a set of Kafka topics/partitions/offsets, or a set of Kinesis streams/shards/sequence numbers.

Figure 4:
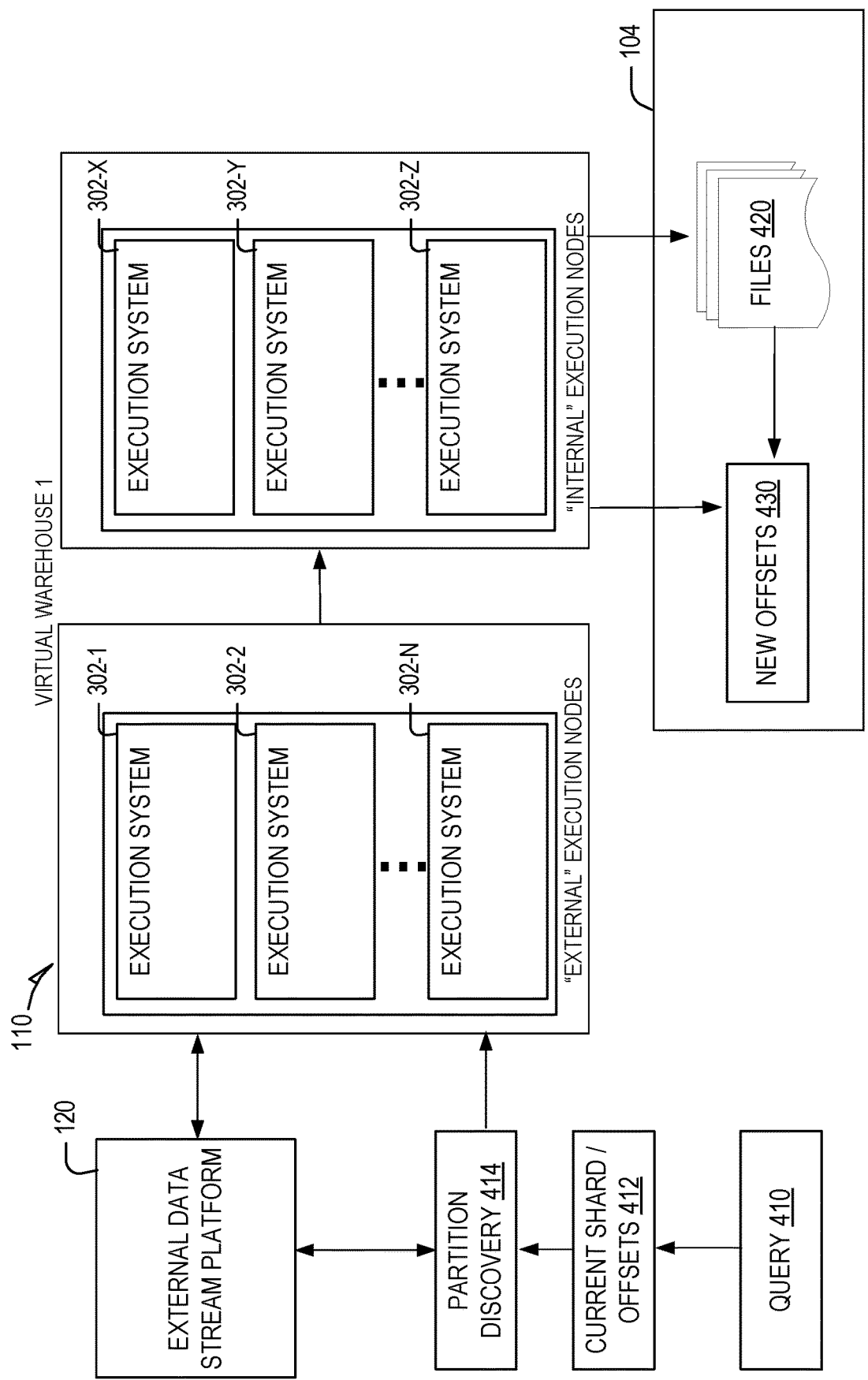
FIG. 4 is a conceptual diagram illustrating using an external stream for executing a query for reading data from an external data stream platform in accordance with some example embodiments.

FIG. 4 is a conceptual diagram illustrating using an external stream for executing a query for reading data from an external data stream platform (e.g., the external data stream platform 120), in accordance with some example embodiments.

As illustrated, a query 410 is received by the request processing service 208 of the compute service manager 108 which analyzes the query 410 and determines that the stream processing engine 228 should handle the query 410 as it relates to performing an operation on an external stream (e.g., SELECT * FROM STREAM STREAM_NAME). In this example, the query 410 includes a string corresponding to an external stream (e.g., on the external data stream platform 120).

In an embodiment, prior to sending the query 410 to the stream processing engine 228, the access manager 202 performs an authorization check to determine that a corresponding user or client that submitted the query has authorization or sufficient privileges to execute the query 410.

After being authorized, the stream processing engine 228 determines the stream, and a security integration object associated with the query 410. In an example, a security integration object is utilized to generate access tokens to enable users to have access to the network-based data warehouse system 102.

The stream processing engine 228 determines a current shard (or partition in some embodiments)/offsets 412. In an example, the current shard/offsets 412 correspond to offsets from a previous time (e.g., the last time) that a read operation was performed on the external stream and information was stored to reflect the results of this read operation. In this manner, a set of offsets, from a previous time that an external stream was accessed during a prior transaction, can be identified, where such set of offsets were previously stored upon completion of the prior transaction.

Using the current shard/offsets 412, the stream processing engine 228 performs partition discovery 414 on the external data stream platform 120 to determine a set of shard/offset pairs for loading (e.g., reading into the network-based data warehouse system 102). In an example, a size of the set can determine a desired degree of parallelism (DoP) for performing the loading of such offsets. The external data stream platform 120 returns a set of shard/offset pairs to the stream processing engine 228.

In an embodiment, the stream processing engine 228 advantageously performs partition discovery 414 and loading of the set of shard/offset pairs in a dynamic and scalable manner. For example, the subject system is capable of assigning computing resources and growing/shrinking such resources to handle the shard/offset discovery and loading as needed depending on an overall load. At query time, the subject system can perform the aforementioned operations dynamically such that the resources are not fixed.

In an example where the external data stream platform 120 is Kafka®, the set of shard/offset pairs is a number of partitions and offsets associated with those partitions. In an example where the external data stream platform 120 is Kinesis®, the set of shard/offset pairs is a number of shards and respective sequence numbers for those shards. The set of shard/offset pairs may change over time. For instance, in Kafka®, the number of partitions may increase, and not decrease, over time. In an example where the external data stream platform 120 is Kinesis®, the number of shards can shrink or increase.

The stream processing engine 228 generates a query plan (e.g., an ordered set of steps used to access data) that indicates the requested DoP, based on the size of the aforementioned set of partitions, to the execution platform 110. Further, the stream processing engine 228 can include, in the query plan, a serialized stream and the security integration object to enable subsequent functions using the object.

In this example, the execution platform 110 processes query plan and launches a set of execution nodes from the execution nodes 302-1, 302-2, and 302-n based on the size of the virtual warehouse (e.g., "virtual warehouse 1" as shown). In an embodiment, the execution platform 110 can "slot" the partitions accordingly (e.g., one partition per processor).

In an implementation, to ensure security, the set of execution nodes from the execution nodes 302-1, 302-2, and 302-n do not store any user data and/or cache user data, and are isolated to a single user or assigned to a same user. Further, different external streams are not shared across the set of execution nodes. If an execution node is compromised and there are multiple external streams being processed on that execution node, it is possible that different integrations with potentially different credentials are being utilized. The credentials associated with a different stream therefore should not be accessible by an attacker, and the aforementioned configuration of the set of execution nodes helps mitigate security risks.

The set of execution nodes from the execution nodes 302-1, 302-2, and 302-n then retrieves the data accordingly from the external data stream platform 120. The set of execution nodes sends rows returned, from the external data stream platform 120, to a second set of execution nodes 302-X, 302-Y, and 302-Z, which then stores the rows returned in the storage platform 104. For purposes of illustration, three execution nodes are shown in the second set of execution nodes, but it is appreciated that more or fewer execution nodes in this second set can be utilized based on the configuration and/or capacity of the virtual warehouse.

During the aforementioned reading of data from the external data stream platform 120, the network-based data warehouse system 102 can read from the shard/offset pairs in parallel. In an implementation, dynamic node provisioning is utilized in which the network-based data warehouse system 102 can scale up resources to read from the external data stream platform 120 in parallel to maximize throughput. For instance, if there are a N number of Kafka® partitions corresponding to a topic that the user wants to read from, the network-based data warehouse system 102 can launch N number of processing nodes to read data in parallel e.g., one execution node is assigned to a Kafka® partition. However, to accommodate for instances in which the network-based data warehouse system 102 does not include as many nodes as there are external shards, the network-based data warehouse system 102 can assign multiple shards to an execution node. Further, this may be done when the network-based data warehouse system 102 determines that the relative amount of work can be handled by a single execution based on historical data and/or machine learning (ML) techniques that are utilized to determine that one node can safely load all of the external shards. Also, this might be the case when the amount of data in the external data stream platform 120 is added to in a relatively slow manner.

At this stage, the query 410 completes successfully. The execution platform 110 commits the new shard/offset information corresponding to new offsets 430 for storing in files 420 on the storage platform 104, which can correspond to respective micro-partitions provided by the storage platform 104.

Figure 5:
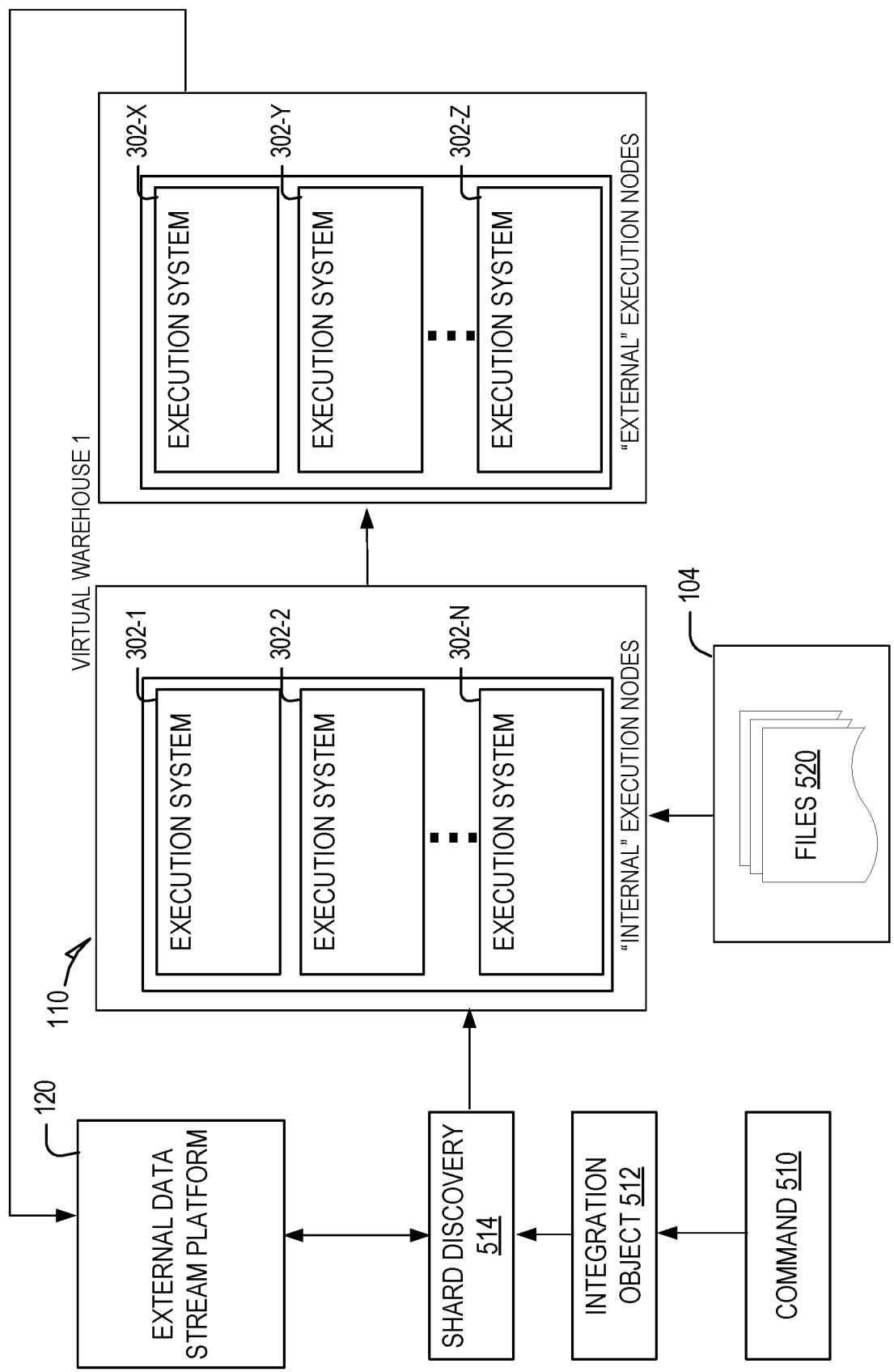
FIG. 5 is a conceptual diagram illustrating using an external stream for executing a command for storing data on an external data stream platform, in accordance with some example embodiments.

FIG. 5 is a conceptual diagram illustrating using an external stream for executing a query for storing data on an external data stream platform (e.g., the external data stream platform 120), in accordance with some example embodiments.

As illustrated, a command 510 is received by the request processing service 208 of the compute service manager 108 which analyzes the command 510 and determines that the stream processing engine 228 should handle the command 510 as it relates to performing an operation on an external stream (e.g., INSERT INTO EXTERNAL_STREAM_NAME AS SELECT * FROM MY_TABLE). In this example, the command 510 includes a string corresponding to an external stream, and a name of a table stored in the storage platform 104.

In an embodiment, prior to sending the command 510 to the stream processing engine 228, the access manager 202 performs an authorization check to determine that a corresponding user or client that submitted the query has authorization or sufficient privileges to execute the command 510. After being authorized, the stream processing engine 228 determines the stream, and a security integration object 512 associated with the command 510.

The stream processing engine 228 performs shard discovery 514 to determine a set of destination shards (e.g., on the external data stream platform 120). The external data stream platform 120 returns the set of destination shards (e.g., partitions) to the stream processing engine 228. As DoP can be determined by a number of shards in the set of destination shards. This enables the execution platform 110 to parallelize data storing on the external data stream platform 120 (when supported by the external data stream platform 120). Given N number of shards, the execution platform 110 can distribute a set of rows being written to among N number of execution nodes.

The stream processing engine 228 generates a query plan (e.g., an ordered set of steps used to access data) that indicates a requested DoP, based on the size of the aforementioned set of destination shards, to the execution platform 110.

In this example, the execution platform 110 processes the query plan and launches a set of execution nodes from the execution nodes 302-1, 302-2, and 302-n based on the size of the virtual warehouse (e.g., "virtual warehouse 1" as shown). Based on the command 510 and/or the aforementioned query plan, the set of execution nodes from the execution nodes 302-1, 302-2, and 302-n reads data (e.g., rows from a table) from files 520 of the storage platform 104. The execution nodes 302-1, 302-2, and 302-n forwards the data to a second set of execution nodes 302-X, 302-Y, and 302-Z, which are responsible for storing the data to the external data stream platform 120. For purposes of illustration, three execution nodes are shown in the second set of execution nodes, but it is appreciated that more or fewer execution nodes in this second set can be utilized based on the configuration and/or capacity of the virtual warehouse.

The second set of execution nodes 302-X, 302-Y, and 302-Z, for each shard, pushes rows from the storage platform 104 to the external data stream platform 120. In an embodiment, sending data to the external data stream platform 120 is performed in a transactional manner e.g., rows pushed during this phase are not persisted until a transaction commit time. If the number of available execution nodes is less than the number of available shards on the external data stream platform 120, the execution platform 110 assigns multiple shards to an execution node.

In an implementation, to ensure security, the second set of execution nodes 302-X, 302-Y, and 302-Z do not store any user data and/or cache user data, and are isolated to a single user or assigned to a same user.

During a commit transaction phase, the network-based data warehouse system 102 commits the external transaction to the external data stream platform 120, and the network-based data warehouse system 102 transaction. In an implementation, the external transaction is committed first, and if committing fails at this time then the command 510 is rolled back and the network-based data warehouse system 102 transaction is also not committed. If the external transaction is successfully committed, at this stage, the command 510 completes successfully, and the transaction is recorded as being committed in the storage platform 104.

In an embodiment, the subject system may utilize a container service platform, such as Kubernetes®, for facilitating the aforementioned reading and writing of data to the external data stream platform 120. Rather than using execution nodes provided by the network-based data warehouse system 102, the container service platform communicates with the external data stream platform 120 containers, and is utilized as a proxy/gateway for each shard/offset pair received. For instance, in an example where a Kafka® topic includes ten partitions, the container service platform could provide up to ten containers, each mapped to a shard/offset pair. Further, when there are fewer containers available then degrees of parallelism, the container service platform can map multiple shard/offset pairs to a single container. As mentioned above, the term "container" is conceptually understood as a being similar to a virtual machine (VM), but may include relaxed isolation properties to share an operating system (OS) among a set of applications. Thus, containers are considered more lightweight in computing resource utilization. Similar to a VM, a container has its own filesystem, CPU, memory, process space, and the like. As a container is decoupled from the underlying infrastructure, the container can be portable across clouds and OS distributions.

Figure 6:
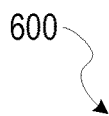
FIG. 6 is a flow diagram illustrating operations of the network-based data warehouse system in performing a method for reading data from an external data stream platform, in accordance with some example embodiments.

FIG. 6 is a flow diagram illustrating operations of the network-based data warehouse system 102 in performing a method 600 for reading data from an external data stream platform, in accordance with some embodiments of the present disclosure. The method 600 may be embodied in computer-readable instructions for execution by one or more hardware components (e.g., one or more processors) such that the operations of the method 600 may be performed by components of network-based data warehouse system 102. Accordingly, the method 600 is described below, by way of example with reference thereto. However, it shall be appreciated that the method 600 may be deployed on various other hardware configurations and is not intended to be limited to deployment within the network-based data warehouse system 102.

At operation 602, the stream processing engine 228 receives an operation for reading data on an external data stream platform (e.g., the external data stream platform 120). In an embodiment, the operations corresponds to a query statement, which includes a command for reading data (e.g., read operation) on the external data stream platform 120. In an example, as discussed before, the query statement can include a SELECT statement for reading data from the external data stream platform 120, which also specifies an external stream and an external integration (e.g., providing information for connecting to and accessing the external data stream platform 120).

At operation 604, the stream processing engine 228 determines a current set of shards and a set of offsets based at least in part on the operation. The current set of shards and offsets, in an example, are in the form of respective shard/offset pairs, where a particular shard can be associated with a particular current offset, from a range of offsets. The current offset, in this example, can correspond to a last offset which was read from the external stream. Thus, the stream processing engine 228 can determine changes from this last offset to a current transactional time of a source table provided by the external data stream platform 120.

In an embodiment, the stream processing engine 228 generates a query plan (e.g., a set of tasks for completing the query statement) with a requested degree of parallelism (DoP) based on the current set of shards and offsets. As mentioned before, the requested DoP can be based on a number of shards corresponding to the current set of shards and offsets.

At operation 606, the execution platform 110, based on the current set of shards and offsets, performs the operation (e.g., the query statement) on the external data stream platform 120. In an example, the execution platform 110 processes the requested DoP and launches a set of execution nodes based on the size of the virtual warehouse. The execution platform 110 assigns an execution node, from a set of execution nodes, to each shard from the current set of shards. Each assigned execution node performs the read operation on the external data stream platform 120, where the read operation is performed in parallel with at least another assigned execution node.

At operation 608, the execution platform 110 receives data from the external data stream platform 120. The set of execution nodes sends rows returned, from the external data stream platform 120, to a second set of execution nodes, which then stores the rows returned in the storage platform 104.

At operation 610, the execution platform 110 indicates that the operation is complete. In an embodiment, the execution platform 110 commits new shard/offset information corresponding to new offsets for storing on the storage platform 104.

Figure 7:
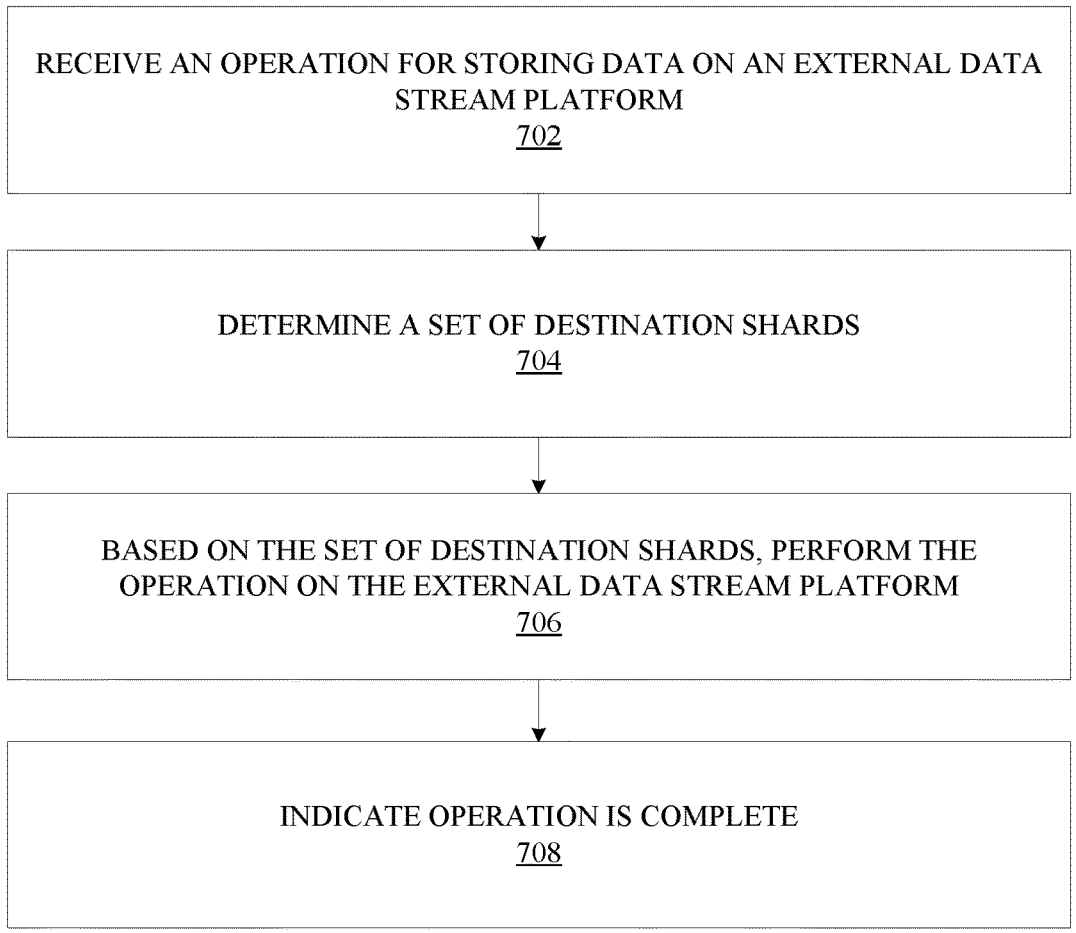
FIG. 7 is a flow diagram illustrating operations of the network-based data warehouse system in performing a method for storing data on an external data stream platform, in accordance with some example embodiments.

FIG. 7 is a flow diagram illustrating operations of the network-based data warehouse system 102 in performing a method 700 for storing data on an external data stream platform, in accordance with some embodiments of the present disclosure. The method 700 may be embodied in computer-readable instructions for execution by one or more hardware components (e.g., one or more processors) such that the operations of the method 700 may be performed by components of network-based data warehouse system 102. Accordingly, the method 700 is described below, by way of example with reference thereto. However, it shall be appreciated that the method 700 may be deployed on various other hardware configurations and is not intended to be limited to deployment within the network-based data warehouse system 102.

At operation 702, the stream processing engine 228 receives an operation for storing data on an external data stream platform (e.g., the external data stream platform 120). In an example, the operation can include a query statement with an INSERT command and a string corresponding to a table stored in the storage platform 104 for reading the data to be stored.

At operation 704, the stream processing engine 228 determines a set of destination shards on the external data stream platform 120. As mentioned before, the stream processing engine 228 performs shard discovery to determine a set of destination shards (e.g., on the external data stream platform 120). The external data stream platform 120 returns the set of destination shards (e.g., partitions) to the stream processing engine 228.

In an embodiment, the stream processing engine 228 generates a query plan (e.g., a set of tasks for completing the query statement) with a requested degree of parallelism (DoP) based on the set of destination shards. As mentioned before, the requested DoP can be based on a number of shards corresponding to the destination shards.

At operation 706, the execution platform 110, based on the set of destination shards, performs the operation on the external data stream platform 120. As discussed before, the execution platform 110 processes the requested DoP and launches a set of execution nodes based on the size of the virtual warehouse. In an example, an execution node is assigned to each shard from the set of destination shards.

Based on the operation and/or the aforementioned query plan, the set of execution nodes reads data (e.g., rows from a table) from the storage platform 104. The execution nodes forwards the data to a second set of execution nodes, which are responsible for storing the data to the external data stream platform 120. In an example, each of the second set of execution nodes is assigned to a particular destination shard. The second set of execution nodes, for each destination shard, pushes rows from the storage platform 104 to the external data stream platform 120. In this manner, the write operation on the external data stream platform 120 can be performed in parallel with at least another execution node from the second set of execution nodes.

At operation 708, the execution platform 110 indicates that the operation is complete. In an example, each of the execution nodes and/or the execution platform 110, receives an indication from the external data stream platform 120 that the write operation was successful, and in response, a second indication is stored indicating that the write operation has been completed on the storage platform 104 associated with the network-based data warehouse system 102.

Alternatively, at least one of the execution nodes and/or the execution platform 110, receives an indication from the external data stream platform 120 that the write operation was not successful. In this example, the execution platform 110 performs a rollback of the write operation, where the rollback avoids committing the write operation to the storage platform 104.

Figure 8:
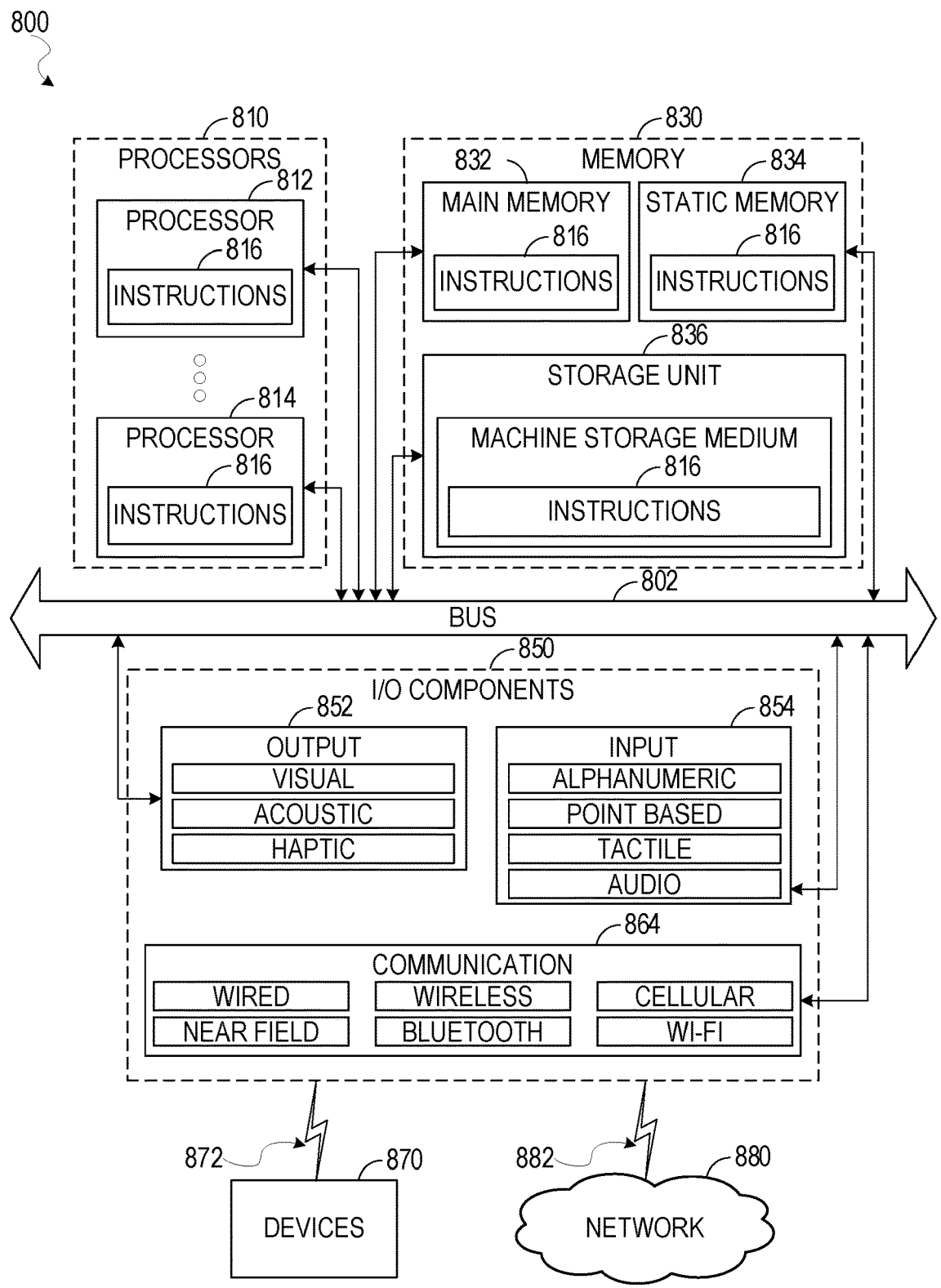
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described above. As another example, the instructions 816 may cause the machine 800 to implement portions of the functionality illustrated in any one or more of FIGS. 1-7. In this way, the instructions 816 transform a general, non-programmed machine into a particular machine 800 (e.g., the compute service manager 108, the execution platform 110, and the user device 112) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include the user device 112 or any other computing device described herein as being in communication with the network-based data warehouse system 102 or the storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magnetooptical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a WiFi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600 and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

EXAMPLES

Example 1 is a network-based database system comprising: at least one hardware processor; and a memory storing instructions that cause the at least one hardware processor to perform operations comprising: receiving an operation to perform on an external data source accessible via a network, the external data source being hosted by an external system separate from the network-based database system; determining a set of shards corresponding to the external data source; determining a set of offsets of each shard of the set of shards; based on the set of shards and the set of offsets, performing the operation on the external data source; and providing an indication that the operation is complete.

In Example 2 the subject matter of Example 1 wherein the operation optionally comprises a query statement.

In Example 3, the subject matter of any one of Examples 1 and 2 wherein the query statement optionally comprises a read operation, and performing the operation on the external data source comprises: assigning an execution node, from a set of execution nodes, to each shard from the set of shards; and performing, by the execution node, the read operation on the external data source, wherein the read operation is performed in parallel with at least another execution node from the set of execution nodes.

In Example 4, the subject matter of any one of Examples 1-3 wherein the operations optionally further comprise: receiving, by the execution node, data from the external data source; and storing a set of new offsets on a storage platform.

In Example 5, the subject matter of any one of Examples 1-4 wherein the query statement optionally comprises a write operation, and performing the operation on the external data source further comprises: assigning an execution node, from a set of execution nodes, to each shard from the set of shards; and performing, by the execution node, the write operation on the external data source, wherein the write operation is performed in parallel with at least another execution node from the set of execution nodes.

In Example 6, the subject matter of any one of Examples 1-5 wherein the operations optionally further comprise: receiving, by the execution node, an indication from the external data source that the write operation was successful; and storing a second indication that the write operation is completed on a storage platform associated with the network-based database system.

In Example 7, the subject matter of any one of Examples 1-6 wherein the operations optionally further comprise: receiving, by the execution node, an indication from the external data source that the write operation was not successful; and performing a rollback of the write operation, wherein the rollback avoids committing the write operation to a storage platform associated with the network-based database system.

In Example 8, the subject matter of any one of Examples 1-7 wherein each execution node from the set of execution nodes optionally includes a processor.

In Example 9, the subject matter of any one of Examples 1-8 wherein each execution node from the set of execution nodes is optionally assigned to a same user.

In Example 10, the subject matter of any one of Examples 1-9 wherein determining a set of offsets optionally comprises: identifying offsets from a previous time that an external stream was accessed during a prior transaction and the offsets from the previous time were previously stored upon completion of the prior transaction.

In Example 11, the subject matter of any one of Examples 1-10 wherein the external data source optionally comprises an external data stream platform.

Example 12 is a method comprising: receiving, using at least one hardware processor, an operation to perform on an external data source accessible via a network, the external data source being hosted by an external system separate from a network-based database system; determining, using the at least one hardware processor, a set of shards corresponding to the external data source; determining, using the at least one hardware processor, a set of offsets of each shard of the set of shards; based on the set of shards and the set of offsets, performing, using the at least one hardware processor, the operation on the external data source; and providing, using the at least one hardware processor, an indication that the operation is complete.

In Example 13, the subject matter of Examiner 12 wherein the operation optionally comprises a query statement.

In Example 14, the subject matter of Examples 12-13 wherein the query statement optionally comprises a read operation, and performing the operation on the external data source optionally comprises: assigning an execution node, from a set of execution nodes, to each shard from the set of shards; and performing, by the execution node, the read operation on the external data source, wherein the read operation is performed in parallel with at least another execution node from the set of execution nodes.

In Example 15, the subject matter of any one of Examples 12-14 further optionally comprising receiving, by the execution node, data from the external data source; and storing a set of new offsets on a storage platform.

In Example 16, the subject matter of any one of Examples 12-15 wherein the query statement optionally comprises a write operation, and performing the operation on the external data source optionally comprises: assigning an execution node, from a set of execution nodes, to each shard from the set of shards; and performing, by the execution node, the write operation on the external data source, wherein the write operation is performed in parallel with at least another execution node from the set of execution nodes.

In Example 17, the subject matter of any one of Examples 12-16 further optionally comprising: receiving, by the execution node, an indication from the external data source that the write operation was successful; and storing a second indication that the write operation is completed on a storage platform associated with the method.

In Example 18, the subject matter of any one of Examples 12-17 further optionally comprising receiving, by the execution node, an indication from the external data source that the write operation was not successful; and performing a rollback of the write operation, wherein the rollback avoids committing the write operation to a storage platform associated with the method.

In Example 19, the subject matter of any one of Examples 12-18 wherein each execution node from the set of execution nodes is optionally assigned to a same user.

In Example 20, the subject matter of any one of Examples 12-19 wherein the external data source optionally comprises an external data stream platform.

Example 21 is non-transitory computer-storage medium comprising instructions that, when executed by a processor, configure the processor to perform operations comprising: receiving an operation to perform on an external data source accessible via a network, the external data source being hosted by an external system separate from a network-based database system; determining a set of shards corresponding to the external data source; determining a set of offsets of each shard of the set of shards; based on the set of shards and the set of offsets, performing the operation on the external data source; and providing an indication that the operation is complete.

In Example 22, the subject matter of Example 21 wherein the operation optionally comprises a query statement.

In Example 23, the subject matter of Examples 21-22 wherein the query statement optionally comprises a read operation, and performing the operation on the external data source optionally comprises: assigning an execution node, from a set of execution nodes, to each shard from the set of shards; and performing, by the execution node, the read operation on the external data source, wherein the read operation is performed in parallel with at least another execution node from the set of execution nodes.

In Example 24, the subject matter of Example 21-23 wherein the operations further optionally comprise: receiving, by the execution node, data from the external data source; and storing a set of new offsets on a storage platform.

In Example 25, the subject matter of Example 21-24 wherein the query statement optionally comprises a write operation, and the operations further comprise: assigning an execution node, from a set of execution nodes, to each shard from the set of shards; and performing, by the execution node, the write operation on the external data source, wherein the write operation is performed in parallel with at least another execution node from the set of execution nodes.

In Example 26, the subject matter of Example 21-25 wherein the operations further optionally comprise: receiving, by the execution node, an indication from the external data source that the write operation was successful; and storing a second indication that the write operation is completed on a storage platform associated with the non-tangible computer-storage medium.

In Example 27, the subject matter of Example 21-26 wherein the operations further optionally comprise: receiving, by the execution node, an indication from the external data source that the write operation was not successful; and performing a rollback of the write operation, wherein the rollback avoids committing the write operation to a storage platform associated with the non-tangible computer-storage medium.

In Example 28, the subject matter of Example 21-27 wherein each execution node from the set of execution nodes optionally includes a processor.

In Example 29, the subject matter of Example 21-28 wherein each execution node from the set of execution nodes is optionally assigned to a same user.

In Example 30, the subject matter of Example 21-29 wherein the external data source optionally comprises an external data stream platform.

The invention claimed is:

1. A system comprising:
at least one hardware processor; and
a memory storing instructions that cause the at least one hardware processor to perform operations comprising:
determining, using a connection to an external data source, a set of shards stored in an external data source, the connection to the external data source being established using an external integration, the external integration including security and configuration information;
determining a set of offsets of each shard of the set of shards;
generating a query plan indicating a degree of parallelism based at least in part on a size of the set of offsets; and
based on the set of shards and the set of offsets, performing an operation on the external data source by performing, using the connection to the external data source, a write operation from a query statement on the external data source, the external data source being different than a storage platform associated with the system.

2. The system of claim 1, wherein the operations further comprise:
launching, based at least in part on the degree of parallelism, a set of execution nodes provided by a virtual warehouse.

3. The system of claim 1, wherein the operations further comprise:
prior to determining the set of shards, receiving an operation to perform on an external data source accessible via a network, the external data source being hosted by an external system separate from the system, the operation comprising a query statement on the external data source, the query statement comprising a write operation.

4. The system of claim 1, wherein the operations further comprise:
receiving an indication from the external data source that the write operation was successful; and
storing a second indication that the write operation is completed on the storage platform associated with the system.

5. The system of claim 1, wherein the set of offsets comprises a number of partitions and offsets associated with each of the partitions, the query plan includes a serialized stream and a security integration object, the security integration object generates access tokens to access the system, performing the write operation is based on executing a statement and the statement comprises a stream name, the stream name associated with the external data source different than the storage platform associated with the system.

6. The system of claim 1, wherein performing the operation on the external data source further comprises:
assigning an execution node, from a set of execution nodes, to each shard from the set of shards; and
performing, by the execution node, a read operation on the external data source, wherein the read operation is performed in parallel with at least another execution node from the set of execution nodes.

7. The system of claim 6, wherein the operations further comprise:
receiving, by the execution node, data from the external data source; and
storing a set of new offsets on a storage platform.

8. The system of claim 1, wherein the security and configuration information comprises a retry timeout, at least one of a maximum number of offsets to process a topic name, a shard number, or a request timeout.

9. The system of claim 1, wherein performing the operation on the external data source further comprises:
assigning an execution node, from a set of execution nodes, to each shard from the set of shards;
performing, by the execution node, the write operation on the external data source, wherein the write operation is performed in parallel with at least another execution node from the set of execution nodes;
receiving, by the execution node, an indication from the external data source that the write operation was not successful; and
performing a rollback of the write operation, wherein the rollback avoids committing the write operation to a storage platform associated with the system.

10. The system of claim 1, wherein determining a set of offsets comprises:
identifying offsets from a previous time that an external stream was accessed during a prior transaction and the offsets from the previous time were previously stored upon completion of the prior transaction.

11. A method comprising:
determining, using a connection to an external data source, a set of shards stored in an external data source, the connection to the external data source being established using an external integration, the external integration including security and configuration information;
determining a set of offsets of each shard of the set of shards;
generating a query plan indicating a degree of parallelism based at least in part on a size of the set of offsets; and
based on the set of shards and the set of offsets, performing an operation on the external data source by performing, using the connection to the external data source, a write operation from a query statement on the external data source, the external data source being different than a storage platform associated with a system.

12. The method of claim 11, further comprising:
launching, based at least in part on the degree of parallelism, a set of execution nodes provided by a virtual warehouse.

13. The method of claim 11, further comprising:
prior to determining the set of shards, receiving an operation to perform on an external data source accessible via a network, the external data source being hosted by an external system separate from the system, the operation comprising a query statement on the external data source, the query statement comprising a write operation.

14. The method of claim 11, further comprising:
receiving an indication from the external data source that the write operation was successful; and
storing a second indication that the write operation is completed on the storage platform associated with the system.

15. The method of claim 11, wherein the set of offsets comprises a number of partitions and offsets associated with each of the partitions, the query plan includes a serialized stream and a security integration object, the security integration object generates access tokens to access the system, performing the write operation is based on executing a statement and the statement comprises a stream name, the stream name associated with the external data source different than the storage platform associated with the system.

16. The method of claim 11, wherein performing the operation on the external data source further comprises:
assigning an execution node, from a set of execution nodes, to each shard from the set of shards; and
performing, by the execution node, a read operation on the external data source, wherein the read operation is performed in parallel with at least another execution node from the set of execution nodes.

17. The method of claim 16, further comprising:
receiving, by the execution node, data from the external data source; and
storing a set of new offsets on a storage platform.

18. The method of claim 11, wherein the security and configuration information comprises a retry timeout, at least one of a maximum number of offsets to process a topic name, a shard number, or a request timeout.

19. The method of claim 11, wherein performing the operation on the external data source further comprises:
assigning an execution node, from a set of execution nodes, to each shard from the set of shards;
performing, by the execution node, the write operation on the external data source, wherein the write operation is performed in parallel with at least another execution node from the set of execution nodes;
receiving, by the execution node, an indication from the external data source that the write operation was not successful; and
performing a rollback of the write operation, wherein the rollback avoids committing the write operation to a storage platform associated with the system.

20. The method of claim 11, wherein determining a set of offsets comprises:
identifying offsets from a previous time that an external stream was accessed during a prior transaction and the offsets from the previous time were previously stored upon completion of the prior transaction.

21. A non-transitory computer-storage medium comprising instructions that, when executed by a processing device, configure the processing device to perform operations comprising:
determining, using a connection to an external data source, a set of shards stored in an external data source, the connection to the external data source being established using an external integration, the external integration including security and configuration information;
determining a set of offsets of each shard of the set of shards;
generating a query plan indicating a degree of parallelism based at least in part on a size of the set of offsets; and
based on the set of shards and the set of offsets, performing an operation on the external data source by performing, using the connection to the external data source, a write operation from a query statement on the external data source, the external data source being different than a storage platform associated with a system.

22. The non-transitory computer-storage medium claim 21, wherein the operations further comprise:
launching, based at least in part on the degree of parallelism, a set of execution nodes provided by a virtual warehouse.

23. The non-transitory computer-storage medium claim 21, wherein the operations further comprise:
prior to determining the set of shards, receiving an operation to perform on an external data source accessible via a network, the external data source being hosted by an external system separate from the system, the operation comprising a query statement on the external data source, the query statement comprising a write operation.

24. The non-transitory computer-storage medium claim 21, wherein the operations further comprise:
receiving an indication from the external data source that the write operation was successful; and
storing a second indication that the write operation is completed on the storage platform associated with the system.

25. The non-transitory computer-storage medium claim 21, wherein the set of offsets comprises a number of partitions and offsets associated with each of the partitions, the query plan includes a serialized stream and a security integration object, the security integration object generates access tokens to access the system, performing the write operation is based on executing a statement and the statement comprises a stream name, the stream name associated with the external data source different than the storage platform associated with the system.

26. The non-transitory computer-storage medium claim 21, wherein performing the operation on the external data source further comprises:
assigning an execution node, from a set of execution nodes, to each shard from the set of shards; and
performing, by the execution node, a read operation on the external data source, wherein the read operation is performed in parallel with at least another execution node from the set of execution nodes.

27. The non-transitory computer-storage medium claim 26, wherein the operations further comprise:
receiving, by the execution node, data from the external data source; and
storing a set of new offsets on a storage platform.

28. The non-transitory computer-storage medium claim 21, wherein the security and configuration information comprises a retry timeout, at least one of a maximum number of offsets to process a topic name, a shard number, or a request timeout.

29. The non-transitory computer-storage medium claim 21, wherein performing the operation on the external data source further comprises:
assigning an execution node, from a set of execution nodes, to each shard from the set of shards;
performing, by the execution node, the write operation on the external data source, wherein the write operation is performed in parallel with at least another execution node from the set of execution nodes;
receiving, by the execution node, an indication from the external data source that the write operation was not successful; and
performing a rollback of the write operation, wherein the rollback avoids committing the write operation to a storage platform associated with the system.

30. The non-transitory computer-storage medium of claim 21, wherein determining a set of offsets comprises:
identifying offsets from a previous time that an external stream was accessed during a prior transaction and the offsets from the previous time were previously stored upon completion of the prior transaction.

* * * * *

UNITED STATES PATENT AND TRADEMARK OFFICE
CERTIFICATE OF CORRECTION

PATENT NO. : 11,593,310 B2
APPLICATION NO. : 17/821985
DATED : February 28, 2023
INVENTOR(S) : Cseri et al.

It is certified that error appears in the above-identified patent and that said Letters Patent is hereby corrected as shown below:

In the Claims

In Column 28, Line 43, in Claim 22, after "medium", insert --of--

In Column 28, Line 48, in Claim 23, after "medium", insert --of--

In Column 28, Line 57, in Claim 24, after "medium", insert --of--

In Column 28, Line 64, in Claim 25, after "medium", insert --of--

In Column 29, Line 7, in Claim 26, after "medium", insert --of--

In Column 29, Line 15, in Claim 27, after "medium", insert --of--

In Column 29, Line 20, in Claim 28, after "medium", insert --of--

In Column 30, Line 1, in Claim 29, after "medium", insert --of--

Signed and Sealed this
Nineteenth Day of March, 2024

Katherine Kelly Vidal
*Director of the United States Patent and Trademark Office*